United States Patent
Wessling et al.

(10) Patent No.: US 8,521,925 B2
(45) Date of Patent: Aug. 27, 2013

(54) METHOD AND COMMUNICATION SYSTEM FOR DETERMINING THE TIME OF AN EVENT IN AN IO DEVICE

(75) Inventors: Klaus Wessling, Bueckeburg (DE); Dietmar Krumsiek, Emmerthal (DE); Christian Gemke, Paderborn (DE)

(73) Assignee: Phoenix Contact GmbH & Co. KG (DE)

( * ) Notice: Subject to any disclaimer, the term of this patent is extended or adjusted under 35 U.S.C. 154(b) by 4 days.

(21) Appl. No.: 13/264,116

(22) PCT Filed: Apr. 16, 2010

(86) PCT No.: PCT/EP2010/002345
§ 371 (c)(1), (2), (4) Date: Dec. 2, 2011

(87) PCT Pub. No.: WO2010/118879
PCT Pub. Date: Oct. 21, 2010

(65) Prior Publication Data
US 2012/0110225 A1    May 3, 2012

(30) Foreign Application Priority Data
Apr. 16, 2009  (DE) .................... 10 2009 017 681

(51) Int. Cl.
*G06F 3/00* (2006.01)
*G06F 5/00* (2006.01)
(52) U.S. Cl.
USPC .......................................... 710/61; 713/400
(58) Field of Classification Search
None
See application file for complete search history.

(56) References Cited

U.S. PATENT DOCUMENTS

| | | | |
|---|---|---|---|
| 8,055,288 B2 * | 11/2011 | Ladd et al. ............ | 455/502 |
| 2002/0131454 A1 | 9/2002 | Franke et al. | |
| 2005/0013394 A1 * | 1/2005 | Rausch et al. ........ | 375/356 |
| 2006/0026314 A1 | 2/2006 | Franchuk et al. | |
| 2007/0053340 A1 * | 3/2007 | Guilford .............. | 370/350 |
| 2011/0080984 A1 * | 4/2011 | Hyoung ............... | 375/362 |
| 2011/0122981 A1 * | 5/2011 | Sinha et al. .......... | 375/356 |

OTHER PUBLICATIONS

Anonymous, "IO-Link: Der neue Standard in der unteren Feldebene der fuehrenden Automatisierungshersteller", "URL:http://www.ifm.com/obj/IO-link_HMI06_Praesentation_ifm.pdf", Jan. 1, 2006, pp. 1-14, Publisher: Internet Citation XP002532270.
"International Search Report and Written Opinion for International Appl. No. PCT/EP2010/002345", Jun. 18, 2010, Publisher: International Searching Authority, Published in: EP.
"International Search Report and Written Opinion for Intl Appl. No. PCT/EP2010/002345", Jun. 18, 2010, Publisher: International Searching Authority, Published in: EP.

* cited by examiner

*Primary Examiner* — Elias Mamo
(74) *Attorney, Agent, or Firm* — Kaplan Breyer Schwarz & Ottesen, LLP

(57) ABSTRACT

A method and communication system that provide an inexpensive approach that enables the times of events that are detected in IO device to be determined in a higher-level controller. The higher-level controller has a system clock and is connected to an IO link device to which multiple first IO devices are able to be connected. In addition, a second IO device is connected to the IO link device. The clock of the second IO device is synchronized by a synchronization device with the system clock of the higher-level controller. The status data that are provided by at least one of the first IO devices and the current time data that the second IO device supplies are transmitted simultaneously to the IO link device. The IO link device assigns the status data received to the received current time data, then transmits these data to the higher-level controller.

6 Claims, 1 Drawing Sheet

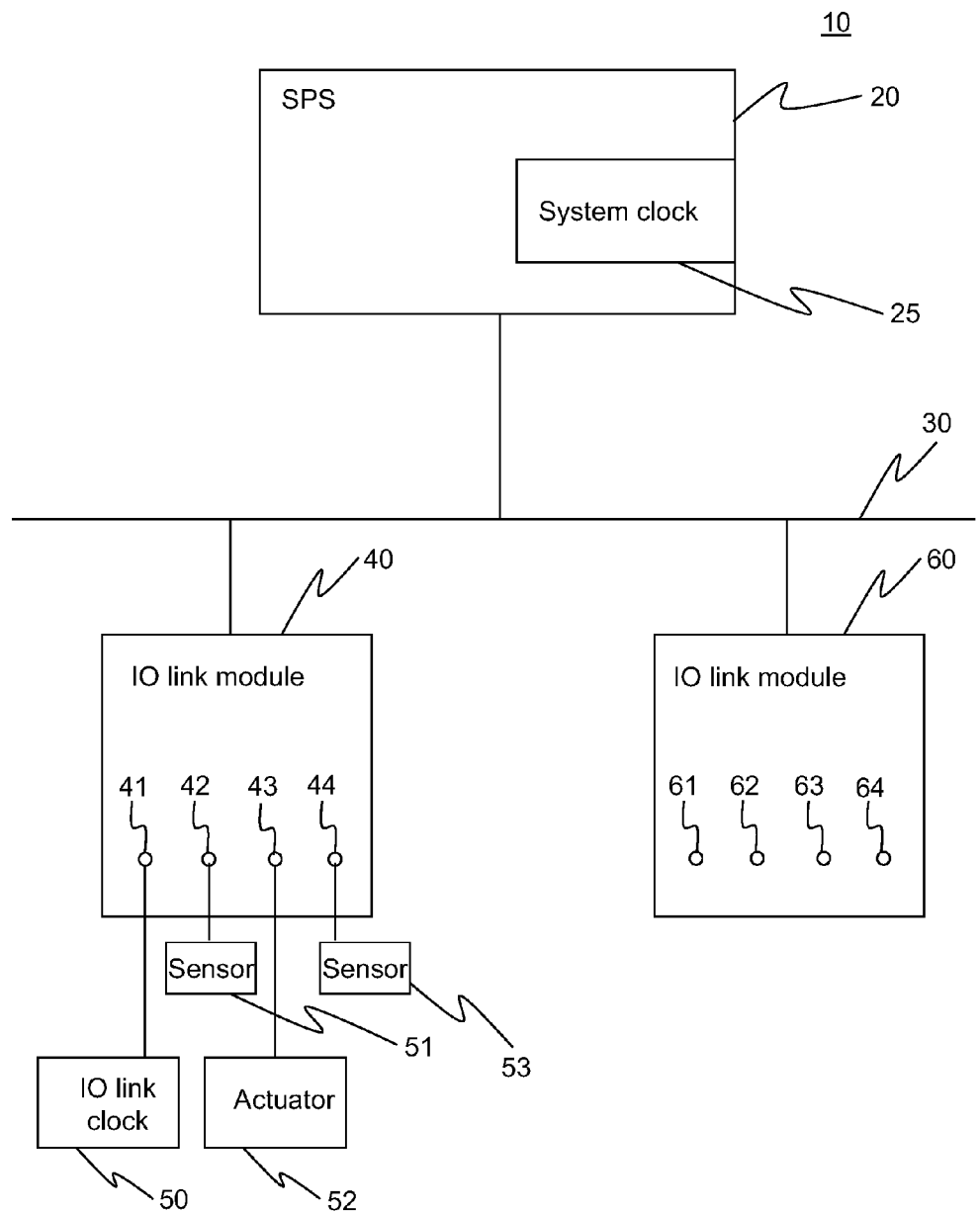

METHOD AND COMMUNICATION SYSTEM FOR DETERMINING THE TIME OF AN EVENT IN AN IO DEVICE

FIELD OF THE INVENTION

The invention relates to a communication system as well as to a method for determining the time of an event detected by a first IO device in this type of communication system that comprises a higher-level controller including a system clock and at least one IO link device connected to the higher-level controller, to which link device a first IO device can be connected in each case.

BACKGROUND OF THE INVENTION

Known automation systems typically comprise a higher-level controller, for example, in the form of a stored program controller (abbreviated as SPC) that can communicate through a field bus system with input/output devices, also called IO devices. The IO devices preferably involve sensors and actuators. For some time now, a special link system, specifically, the IO link communication system, has been used to intelligently link IO devices to an automation system. This standardized IO link communication system includes an IO link master to which multiple IO link devices, as they are called in the IO link standard, are connected in a star topology. The IO link communication system is consequently called a point-to-point communication system. In this type of IO link communication system, the IO link devices can be addressed synchronously, i.e., simultaneously by the IO link master. The communication between the IO link master and the IO link devices connected thereto is preferably effected only in response to a request from the IO link master. Here a differentiation is made between cyclic and acyclic data communications. Process data are transmitted cyclically in data frames. Service data are transmitted acyclically from the IO link devices to the IO link master in response to a request of the IO link master. Finally, the IO link devices communicate through the IO link master with the higher-level control means of the automation system.

It is necessary that the higher-level control means knows precisely when an IO link sensor acquires measurement data, or an IO link actuator performs an action, in order to be able to control and monitor a process sequence in an error-free manner.

SUMMARY OF THE INVENTION

The object of this invention is therefore to provide a method and a communication system that inexpensively and easily enables the times of events which are acquired in IO devices to be determined in a higher-level controller.

A central idea of the invention is the fact that IO devices are connected to a higher-level controller through an IO link system, preferably the standardized IO link communication system. To this end, multiple IO devices are connected through a star topology to an IO link unit. These IO devices preferably involve sensors and actuators. Neither the IO devices nor the IO link device have a local clock. Instead, a clock is connected to the IO link device in the form of another IO device, this clock being synchronized with a system clock of the higher-level controller. Since the time data supplied by the clock and the measurement or status data acquired by the IO devices are read out and transmitted simultaneously to the IO link device, a precise time stamp can be assigned to the measurement data or events acquired by the IO devices.

Accordingly, a communication system comprises a higher-level controller including a system clock. In addition, the communication system comprises at least one IO link device connected to the higher-level controller, the link device having multiple connection devices, also called ports, whereby in each case a first IO device can be connected to the connection devices/ports. The first IO devices and the IO link device do not include a local clock. A second IO device is connected to one of the connection devices/ports, which IO device includes a clock. In addition, a synchronization device is provided that synchronizes the clock connected to the IO link device with the system clock of the higher-level controller. The transmission of status data that are supplied by at least one of the first IO devices and the transmission of current time data that the second IO devices supplies are effected simultaneously to the IO link device. The IO link device assigns the received current time data to the status data received by the at least one first IO device, then transmits these data to the higher-level controller.

The first IO devices preferably involve sensors and/or actuators, with the result that the status data supplied constitute primarily measurement events from a sensor or action events from an actuator. An action event can be a switching event, such as, for example, opening or closing a relay or a valve.

The IO link device, the first IO devices, as well as the second IO device are designed according to the IO link standard. An IO link communication system of this type is distinguished by the fact that the IO devices are connected to the IO link device in a star topology. When triggered by a request command, the data of the IO devices can be transmitted synchronously to the IO link device. The data provided by the first IO devices and time data supplied by the second IO device can be transmitted here acyclically or cyclically.

It should be noted, however, that the IO link device can also relate to any other known, or yet-to-be-developed sensor/actuator link system.

A time correction value is determined and optionally stored in each first IO device in order to ensure that the time of the status data acquired in the first IO devices—that is, the acquired measurement and/or action events—can be determined precisely. The time correction value provides the internal time delay between the acquisition of status data and the transmission time of the status data during a transmission cycle in a respective first IO device. The time correction value can be read out from each first IO device as a parameter during a communication cycle.

Accordingly, a method is provided for determining the time of a measurement event or action event acquired by a first IO device in a communication system. The measurement event or action event are represented by status data. The communication system comprises a higher-level controller including a system clock and at least one IO link device connected to the higher-level controller, which link device has multiple connection devices/ports to which a first IO device is able to be connected in each case. Neither the first IO devices nor the IO link device have a local clock. In addition, a second IO device that includes a local clock is connected to one of the connection devices/ports.

In order to be able to determine the times of the event acquired by at least one first IO device, the clock connected to the IO link device is synchronized with the system clock of the higher-level controller.

The status data, which constitute the measurement and/or action events acquired by the first IO devices, are transmitted simultaneously with the supplied current time data to the IO link device. The received status data from the at least one first IO device are assigned in the IO link device to the received current time data. The assigned data are then transmitted to the higher-level controller.

Assignment of the status data to the time data can be achieved using an approach whereby they are transmitted by the IO link device to the higher-level controller in the same transmission frame. If time data and data are transmitted in different frames, a unique identifier can be used that confirms the integral association between data and time data.

A time correction value is determined and stored in each connected first IO device in order to be able to precisely determine the timing of the events acquired in at least one first IO device. The respective correction value is transmitted through the IO link device to the higher-level controller. The received current time data are then corrected in the higher-level controller with respect to each first IO device as a function of the corresponding time correction value.

The synchronization between the system clock and the clock connected to the IO link device can be effected continuously or at adjustable points in time. The synchronization data here can be sent over the communication paths through which the process data are also transmitted. Alternatively or additionally, a separate communication path can be established for the synchronization data between the higher-level controller and the IO clock, for example, through a Bluetooth or infrared connection.

BRIEF DESCRIPTION OF THE DRAWING

The invention is described below in more detail based on an exemplary embodiment in combination with FIG. 1, which depicts an automation system (10).

DETAILED DESCRIPTION

Providing a communication system by way of example, FIG. 1 depicts an automation system 10 that includes a programmable controller (SPS). Simply for the sake of graphic clarity, only one system clock 25 is shown in the SPS 20. SPS 20 is connected, for example, to a field bus 30. Actuators and sensors are connected through so-called IO link modules to field bus 30 and can communicate with SPS 20. Simply for the sake of graphic clarity, only two IO link modules 40 and 60 are connected to the field bus. Data can be exchanged between SPS 20, and IO link modules 40 and 60, based on the standardized IO link communication protocol. To this end, various message types are used to transmit process data, service data, event data, and other data in the form of input and output data.

The two IO link modules 40 and 60 each have, for example, 4 ports, specifically 41, 42, 43, and 44, or 61, 62, 63, and 64, to which one IO device each can be connected. In this case, IO devices are connected only to IO link module 40. Specifically, one sensor 51 is connected to port 42, one actuator 52 is connected to port 43, and again one sensor 53 is connected to port 44. It should be noted that IO link module 40, the two sensors 51 and 53, and actuator 52 do not have a local clock. Another IO device 50 is connected to port 41 of IO link module 40, which port includes a clock. IO devices 50, 51, 52, and 53 that are connected through a star topology to IO link module 40 simultaneously transmit their respective time data, measurement data, or status data to IO link module 40.

A synchronization device (not shown) can be implemented in SPS 20, which device under the control of a synchronization protocol ensures that IO link clock 50 interfacing with IO link module 40 is synchronized continuously or at predetermined points in time. The synchronization data can be transmitted in cyclic or acyclic communication cycles as control data through field bus 30 to IO link clock 50. Alternatively, the synchronization data can also be transmitted from SPS 20 to IO clock 50 through a separate wireless or wire-type connection. As a result, the data traffic load through field bus 30 can be reduced. The synchronization between system clock 25 and IO clock 50 can be implemented, for example, according to the IEEE 1588 standard. IO link module 60 can be wired analogously to IO link module 40, thereby in turn enabling an IO device including a local clock to be connected to one of the ports.

In a special embodiment, sensors 51 and 53 as well as actuator 52 can be addressed by SPS 20 in a targeted fashion, for example, individually or groupwise, so as to transmit data through IO link module 40 to SPS 20. It is not important which sensor or which actuator transmits data to IO link module 40. The current time data from clock 50 are always transmitted to IO link module 40 synchronously with the corresponding status data read from the sensors or the actuators.

The functional principle of communication system 10 will now be described in more detail based on an exemplary embodiment.

It is assumed that the status data of sensors 51 and 53, and the time date of IO clock 50 are read out cyclically, for example, every second, and simultaneously. The last read-out cycle occurred, for example, at 11:55:01. It is furthermore assumed that current sensor data is present in sensors 51 and 53, while current time data about an action event is stored in actuator 52. The status data of the sensors and of the actuator can be binary states (0 or 1), for example, exceeding or falling below a threshold value, or the closing or opening of a relay. Now it is assumed that the states in sensors 51 and 53, and in actuator 52, have each changed from 0 to 1 since the last read-out cycle. After a new request from IO link module 40, the current status data of actuator 52, and of sensors 51 and 53, are read out simultaneously with the current time data from clock 50 and transmitted to IO link module 40. The current clock time of IO clock 50 reads 11:55:02 at the time of the read-out. This mode of communication is familiar to the person skilled in the art from the IO link standard. The status data from actuator 52, and sensors 51 and 53, are assigned to the current time data supplied by clock 50, whereby they are packed, for example, in a shared data frame and then transmitted by IO link module 40 to SPS 20. As a result, a precise time stamp is marked on the status data that has been detected by sensors 51 and 53, and by actuator 52. The time stamp enables SPS 20 to determine the precise point in time of the measurement or action events, even though neither IO link module 40 nor sensors 51 and 53, nor actuator 52, have a local clock. Since the status data, that is, a logical zero in each case from sensors 51 and 53, and from actuator 52, of the last read-out cycle, is known to SPS 20, it can determine the time of the current status changes. This is because SPS 20 has been informed with the current read-out cycle that the status data of sensors 51 and 53, and of actuator 52, have switched from zero to one—specifically at time 11:55:02. Consequently, SPS 20 knows that a status change has occurred in sensors 51 and 53, and in actuator 52, between 11:55:01 and 11:55:02. As a result, SPS 20 can determine the acquisition time of status data, or the time at which status data change, with a precise time accuracy that corresponds to the time interval between two successive read-out cycles.

In order to be able to determine the acquisition time or change time more precisely, sensors 51 and 53, and actuator 52 can each include a counter (not shown) that measures the time between two read-out cycles. As soon as status data is detected or a status change has been determined, the counter can be stopped. The count value of the counter corresponds to a time correction value or internal time offset that represents a time delay with respect to the IO link cycle. For example, the count value corresponds to a time interval of 20 ms, which means that a status change has occurred 20 ms after the last read-out cycle that was effected at 11:55:01. The internal time offsets stored in the sensors and the actuator can be read out from the sensors and actuator as parameters in a communication cycle, and supplied through the IO link module to SPS 20. By responding to the specific time offset, SPS 20 is able to correct the current time data received from IO link clock 50 individually for each IO device.

What is claimed is:

1. A communication system (1) comprising:
   a higher-level controller (20) including a system clock (25); and
   at least one input/output (IO) link device (40) connected to the higher-level controller (20), the IO link device having multiple connection devices/ports (41-44) to which in each case a first IO device (51-53) is able to be connected, wherein neither the IO link device (40) nor the first IO devices (51-53) have a local clock;
   wherein a second IO device (50) is connected to one of the connection devices/ports (41) of the IO link device (40), the second IO device including a clock, wherein a synchronization device is provided that synchronizes the clock of the second IO device (50) with the system clock (25) of the higher-level controller (20), and
   wherein the transmission of status data which are provided by at least one of the first IO devices (51-53) and the transmission of current time data which the second IO device (50) supplies are effected simultaneously to the IO link device (40), and wherein the IO link device (40) assigns the status data received from the at least one of the first IO devices to the received current time data and transmits these data to the higher-level controller (20).

2. The communication system according to claim 1, wherein the IO link device (40) and the IO devices (50-53) are designed according to the IO link standard, and
   wherein the transmission of the status data provided by the first IO devices (51-53) and the transmission of the time data supplied by the second IO device (50) are effected acyclically or cyclically.

3. The communication system according to claim 1, wherein each first IO device (51-53) has a device to determine a time correction factor that can be stored in a memory, and
   wherein the higher-level controller (20) can correct the received time data based on time correction data with respect to the respective first IO device (51-53).

4. A method for determining the time of an event acquired by a first input/output (IO) device (51-53) in a communication system (10) that comprises a higher-level controller (20) including a system clock (25) and an IO link device (40) connected to the higher-level controller (20), the IO link device having multiple connection devices/ports to which in each case a first IO device (51-53) is able to be connected, wherein a second IO device (50) is connected to one of the connection devices/ports (41), the second IO device including a clock, the method comprising:
   synchronizing the clock connected to the IO link device (40) with the system clock (25);
   simultaneously transmitting status data that represent a detected event and are provided by at least one first IO device (51-53), and current time data supplied by the clock of the second IO device (50) to the IO link device (40);
   assigning in the IO link device (40) the received status data of the at least one first IO device (51-53) to the received current time data; and
   transmitting the status data from the at least one first IO device (51-53) and the current time data from the IO link device (40) to the higher-level controller (20).

5. The method according to claim 4, further comprising:
   determining a time correction value in each connected first IO device;
   transmitting the respective correction value to the higher-level controller; and
   correcting the received current time data in the higher-level controller (20) with respect to each first IO device (51-53) as a function of the corresponding time correction value.

6. The method according to claim 4, wherein the IO link device and the IO devices are designed according to the IO link standard and that the time data are read out from the clock and status data are read out from connected first IO devices simultaneously, and transmitted to the IO link device.

* * * * *

UNITED STATES PATENT AND TRADEMARK OFFICE
CERTIFICATE OF CORRECTION

PATENT NO.       : 8,521,925 B2  
APPLICATION NO.  : 13/264116  
DATED            : August 27, 2013  
INVENTOR(S)      : Wessling et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 51 days.

Signed and Sealed this

Fifteenth Day of September, 2015

Michelle K. Lee
*Director of the United States Patent and Trademark Office*